(12) United States Patent
Lorenz et al.

(10) Patent No.: US 8,586,666 B2
(45) Date of Patent: Nov. 19, 2013

(54) METHOD FOR INTRODUCING CARBON DIOXIDE

(75) Inventors: Juergen Lorenz, Bopfingen (DE); Elisabeth Koenig, Lauchheim (DE); Joerg Kienle, Fremdingen (DE); Rudolf Lauter, Fremdingen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/372,556

(22) Filed: Feb. 14, 2012

(65) Prior Publication Data

US 2012/0138226 A1 Jun. 7, 2012

Related U.S. Application Data

(63) Continuation of application No. PCT/EP2010/061246, filed on Aug. 3, 2010.

(30) Foreign Application Priority Data

Aug. 14, 2009 (DE) .......... 10 2009 028 541

(51) Int. Cl.
- *C08F 214/06* (2006.01)
- *C08L 27/00* (2006.01)
- *C08L 27/04* (2006.01)
- *C08L 27/06* (2006.01)

(52) U.S. Cl.
USPC ........... 524/567; 524/552; 524/507; 521/150; 422/305; 422/306

(58) Field of Classification Search
USPC ........... 524/567, 552, 507; 521/150; 422/305, 422/306
See application file for complete search history.

(56) References Cited

U.S. PATENT DOCUMENTS 6,087,439 A 7/2000 Ganster et al.
2011/0237696 A1* 9/2011 Achten et al. ................. 521/150

FOREIGN PATENT DOCUMENTS

| WO | 9853019 A1 | 11/1998 |
| WO | 0177248 A1 | 10/2001 |
| WO | WO 2010/025862 | * 3/2010 |

* cited by examiner

Primary Examiner — James J Seidleck
Assistant Examiner — Deve E Valdez
(74) Attorney, Agent, or Firm — Sun Hee Lehmann

(57) ABSTRACT

A method for producing an adhesive layer, an aqueous adhesive dispersion containing chlorinated polyolefins and further additives, having a pH from 10 to 13, being provided; said adhesive being adjusted, by the introduction of $CO_2$, to a pH below 9.0; and an adhesive layer then being applied, wherein the quantity of $CO_2$ to be introduced is determined and regulated by measuring the pH of the dispersion.

10 Claims, No Drawings

METHOD FOR INTRODUCING CARBON DIOXIDE

CROSS-REFERENCE TO RELATED APPLICATIONS

This application is a continuation of International Patent Application No. PCT/EP2010/061246 filed Aug. 3, 2010, which claims priority to German Patent Application 102009028541.5 filed Aug. 14, 2009, the contents of both of which are incorporated herein by reference.

The invention relates to a method for, metering carbon dioxide into an adhesive dispersion based on chlorinated polyolefins. The invention further relates to a water-based adhesive dispersion that is reacted with carbon dioxide to yield an application-ready adhesive.

Solvent-containing adhesives based on chloroprene are known. In this context, the adhesive is applied as a solution or dispersion, and the solvent must then evaporate. This application mode is time-consuming, and because of the solvent content does not meet present-day environmental requirements. Aqueous adhesives as dispersions are likewise known. In this context, various agents are used to adjust the alkaline pH of an adhesive dispersion.

WO 01/77248 describes an aqueous adhesive dispersion that contains a crystallizable polyester, a polychloroprene, an acrylate polymer, a further thermoplastic resin, and selected stabilizers. A branched amino alcohol is described as a stabilizer. A modification of the pH by introducing $CO_2$ is not described.

WO 98/53019 describes aqueous adhesives based on polychloroprene that contain boric acid. In this context, an alkaline pH is established and the adhesive can be used. The pH is adjusted by means of boric acid or an amino acid. A change in application is not described.

U.S. Pat. No. 6,087,439 describes aqueous dispersions made of chlorobutadiene polymers that can be used, together with aliphatic isocyanates, as an adhesive. In this context, $CO_2$ is formed after the isocyanates are mixed in. This results in a modification of the pH, and as a result the binding agent is then precipitated and subsequently crosslinked.

DE 10 2008 045 805 describes aqueous dispersions made of polychloroprene. These are said to be adjusted as to pH using $CO_2$, the carbonic acid being introduced by shaking or stirring. A volume is determined; an accurate pH measurement is not carried out.

When weak inorganic or organic acids are added, the problem always arises of homogeneously distributing the acid in the dispersion. This is difficult especially with adhesives of higher viscosity, and results in inhomogeneous products. The addition of isocyanates, in which context a modification of pH is also brought about by a chemical reaction, is expensive and, depending on the isocyanate selected, also problematic in terms of health hazards.

Methods have also been described for modifying the pH of a chloroprene dispersion by adding $CO_2$ in order then to apply said dispersion. Problems arise in this context, however, in terms of establishing reproducible pH values for the various adhesive dispersions. Because the binding agents resp. the neutralizing agents are often manufactured in batches, the sensitivity of a dispersion with respect to the introduced $CO_2$ is different. The transition into the aqueous phase is often dependent on process conditions. The adhesives exhibit a fluctuating neutralization behavior, so that the quantity of $CO_2$ required changes as a function of the constituents of the adhesive. Contaminants can also have an influence on the quantity of $CO_2$ needed in order to achieve a suitable pH. These differing quantities, however, result in differing adhesive properties for the user, i.e. they interfere with a standardized bonding process.

There arises from the existing art the object of making available a method for adjusting a pH value of an aqueous adhesive dispersion based on chlorinated polyolefins, in which context $CO_2$ is to be incorporated into the dispersion. The quantity of gaseous $CO_2$ required is to be monitored in this context so that reproducible utilization and manufacture of an adhesive layer is possible. In addition, an aqueous adhesive based on chlorinated polyolefins is to be made available, which adhesive is stable in the alkaline pH range but can quickly form an adhesive layer from the dispersion as a result of lowering the pH with introduced $CO_2$.

The object is achieved by a method for producing an adhesive layer, a shelf-stable aqueous adhesive dispersion containing chlorinated polyolefins and further additives, having a pH from 10 to 13, being provided; said adhesive being adjusted, by the introduction of $CO_2$, to a pH below 9.0; and an adhesive layer then being applied, characterized in that the quantity of $CO_2$ to be introduced is determined and regulated by continuous measurement of the pH of the dispersion.

The method according to the present invention is suitable for aqueous adhesive dispersions that contain chlorinated polyolefins as principal binding agents. Such dispersions can additionally contain further polymers and adjuvants. They are preferably solvent-free, and have a solids content from 35 to 80%. They are generally shelf-stable in an alkaline environment, but as a result of a lowering of the pH can transition into an unstable phase from which they can then be applied as an adhesive. A further subject of the invention is an aqueous adhesive dispersion based on chlorinated polyolefins that, after reception of a defined quantity of $CO_2$, yields an applicable adhesive that has a long processing time.

The subject matter of the invention is a method for producing adhesive layers, in which context an aqueous dispersion of an adhesive suitable according to the present invention, in shelf-stable form having a pH from 10 to 13, has gaseous $CO_2$ added to it and mixes therewith. It is known that the pH of alkaline solutions is lowered by the addition of $CO_2$, i.e. the solution becomes more acidic. In accordance with the procedure according to the present invention, the adhesive dispersion is homogenized upon introduction of the $CO_2$. In accordance with the procedure according to the present invention, a pH measuring electrode is present in the dispersion. The pH of the dispersion is measured, at short intervals or continuously, during metering of the $CO_2$. The quantity of $CO_2$ added is selected so that the resulting pH of the dispersion is in the range between 7.0 and 9.0. In this range, dispersions form which are still processable but which coagulate immediately after processing and yield an adhesive layer.

The known measurement devices for determining pH can be used as transducers. It is preferred for a continuous measurement to occur. For example, a single-rod electrode can be used. Such electrodes and indicating devices are known to one skilled in the art.

In the context of the procedure according to the present invention, it must be ensured that a homogeneous distribution of the introduced $CO_2$ is produced in the mixing vessel. One embodiment works in such a way that the gas is introduced, for example, through a perforated plate, and the dispersion is homogenized by the rising gas. In another embodiment, mixing is carried out by stirring or by pump circulation. It is preferred according to the present invention that mixing occur by stirring. The quantity of $CO_2$ to be introduced is determined according to the pH. It is advantageous in the method according to the present invention if the time for the pH to change from the as-delivered form to the application form (for example, pH 7 to pH 9) is achieved in a time period from 0.5 minutes to 20 minutes. This can be influenced by the quantity of $CO_2$ introduced, and by the rate of homogenization of the adhesive dispersion. It is possible for one skilled in the art to ensure, by simple experiments, suitable metering as a function of pH. It is useful in particular if the quantity of adhesive prepared is adjusted to the requisite pH within a time period of between 2 and 15 minutes. It is advantageous if a pH equilibrium has become adjusted at this point in time.

The adhesive, adjusted in accordance with the method according to the present invention to a pH from 7 to 9, is shelf-stable and processable as a dispersion for a time span of up to 8 hours. This dispersion can be applied without further shearing or heating. This application can occur, for example, using nozzles, rolls, rollers, ductor blades, or in particular by spray application. The adhesive can be directly sprayed, or spraying is assisted by an additional gas flow. During spray application it is possible for a portion of the water to evaporate. An adhesive layer is produced on the substrate immediately after it is encountered. Said layer is usually no longer flowable, and it can be immediately bonded to a second substrate. It is also possible, however, to bond the adhesive layer thereby generated only after a waiting time of up to 15 minutes. Adhesive bonding can be assisted by the application of light pressure. It is possible in this context for one substrate to be coated, but it is also possible for both substrate surfaces to have a corresponding adhesive layer. Regardless of any theory, it is assumed that upon application and bonding of the substrates, the adhesive coagulates, and immediate adhesion between the bonded substrates occurs.

The open time can be influenced by way of the pH selected for the ready-to-apply adhesive dispersion, and the quantity of $CO_2$ introduced. If the pH is selected to be in the lower range, for example below 7.8, good processing is possible and a rapid buildup of adhesion is observed upon bonding of the substrates. If a pH in the upper region is selected, for example from 8.0 to 9.0, the processing time of the adhesive dispersion increases. The adhesion buildup of the bonded substrates is somewhat slower in this context, and the open time for processing and bonding is longer.

A further subject of the invention is an aqueous adhesive dispersion that contains chlorinated polyolefins and is suitable as a contact adhesive. A dispersion-based adhesive according to the present invention contains at least one chlorinated polyolefin as a binding agent. Examples of such binding agents are homo- and copolymers of polyethylene, polypropylene, polybutylene, polyisobutene, polyhexene, polyoctene, polydecene, and polyoctadecene, polystyrene; polymers containing substituted monomers, such as p-methoxystyrene, acrylonitrile, methacrylonitrile, vinyl acetate, vinyl propionate, vinyl butyrate, vinyl benzoate, vinyl methyl ether, isobutylene, ethylene, vinyl chloride, vinylidene chloride, alkyl acrylates, acrylic acid, and methacrylic acid; similar monoolefinic polymerizable compounds such as butadiene-1,3, isoprene, and other butadiene-1,3 hydrocarbons that contain chlorine as a substituent. These polymers can be subjected after polymerization, as a dissolved or melted product, to chlorination. Another procedure, however, produces suitable polymers by copolymerization with chlorinated monomers. Known monomers for this are, for example, vinyl halide, vinylidene halide, chloroprene, styrene, and monoalkenyl aromatic alkyl halides, vinylbenzyl chloride, p-chlorostyrene, 3,5-dichlorostyrene, p-trichloromethyl vinylbenzene, vinylbenzyl chloride-(4-chloromethyl vinylbenzene), or 2,3-dihalogen-1,3-butadiene. Chlorosulfonated ethylene polymers or chlorine rubber are also suitable.

Chlorinated polymers having a chlorine content from approx. 20 to 75 wt % are preferably suitable, for example chlorinated polypropylene/polyethylene or polychloroprene at approx. 20 to 50 wt %, or chlorinated polyvinyl chloride having a chlorine content of approx. 60 to 75 wt %. Polychloroprenes are particularly suitable. The chlorinated polyolefins can be used in a mixture, but it is also possible to use only one polymer. Chlorinated polyolefins of this kind are commercial obtainable. The quantity of chlorinated polymers is intended to be equal to 20 to 50 wt % based on the entire adhesive dispersion, in particular from 25 to 40 wt %. They are intended in particular to be used as an aqueous dispersion. Such dispersions are present in this context as an alkaline solution whose pH is between 10 and 13.

Further base polymers can also be additionally contained in the adhesives that are suitable according to the present invention. These can be, for example, (meth)acrylate copolymers, styrene copolymers, styrene acrylates, or styrene butadienes. Such poly(meth)acrylates are obtainable, for example, by copolymerization of ethylenically unsaturated carboxylic acid esters, such as esters of acrylic acid, of methacrylic acid, of crotonic acid, or of maleic acid. Preferably, known $C_1$ to $C_{12}$ alkyl esters of (meth)acrylic esters are polymerized. Functionalized monomers can also be contained in this context, for example monomers carrying OH groups or COOH groups. Further copolymerizable monomers can also be contained, for example ethylene, styrene, substituted styrenes. Functionalized or non-functionalized copolymers can thereby be obtained; the copolymers can have a high glass transition temperature ($T_g$) or a low $T_g$.

Styrene copolymerizates are another class of base polymers. These are copolymerizates of styrene and derivatives thereof. Additional structural units can also be contained, such as butadiene, isoprene, ethylene, propylene, and/or acrylate structures. These further polymers can also be manufactured as a dispersion, and they can optionally be stabilized using known surfactants. Acrylate polymers or styrene copolymers of this kind are commercially obtainable as a dispersion, as a solution, or in solvent-free form. The quantity of additional base polymers can be equal to between 5 and 35 wt %, based on the adhesive dispersion.

Plasticizers are a further constituent of suitable adhesives. These plasticizers are used by preference to adjust the flow behavior or flexibility of the adhesive layer. Suitable plasticizers are, for example, medicinal white mineral oils, naphthenic mineral oils, polypropylene or polybutylene or polyisoprene oligomers, hydrogenated polyisoprene and/or polybutadiene oligomers, benzoate esters, phthalates, or adipates. Hydrogenated plasticizers, for example paraffinic hydrocarbon oils, or polypropylene glycol, polybutylene glycol, and polymethylene glycol are also suitable; alkyl monoamines and fatty acids can likewise be used. It is preferred to use esters as plasticizers, for example phthalate, benzoate, or adipate esters. The plasticizers are contained in general at a concentration from 0 to 25 wt %, preferably from 1 to 15 wt %.

The adhesive dispersion can furthermore additionally contain as an additive 0.01 to 5 wt %, based on the entire adhesive dispersion, of at least one surface-active substance. These are understood as substances that lower the surface tension with respect to water, such as defoamers, surfactants, wetting agents. As a rule, they contain hydrophilic and hydrophobic, in particular lipophilic groups. The surfactants contained can be anionic, nonionic, or ampholytic, or mixtures of two or more thereof.

Examples of suitable anionic surfactants are alkyl sulfates, alkyl and alkylaryl ether sulfates, such as alkylphenol ether sulfates, fatty alcohol and fatty alcohol ether sulfonates, in particular alkylsulfonates, alkylarylsulfonates, taurides, esters and semiesters of sulfosuccinic acid, which optionally can be ethoxylated, alkali and ammonium salts of carboxylic acids, for example of fatty acids, phosphoric acid partial esters, and alkali and ammonium salts thereof.

Examples of ampholytic surfactants are long-chain-substituted amino acids such as N-alkyl-di(aminoethyl)glycine or N-alkyl-2-aminopropionic acid salts, betaine such as N-(3-acylamidopropyl)-N,N-dimethylammonium salts, or alkylimidazolium betaines.

Examples of nonionic surfactants are alkylpolyglycol ethers, alkylarylpolyglycol ethers, fatty alcohol polyglycol ethers, fatty alcohol EO/PO adducts and alkylphenol EO/PO adducts, ethylene oxide/propylene oxide (EO/PO) block copolymers, by preference those having approximately 8 to approximately 50 EO resp. PO units, addition products of alkylamines, fatty acids and resin acids, alkylpolyglycosides having linear or branched, saturated or unsaturated alkyl residues with an average of 8 to approximately 24 carbon atoms and an oligoglycidyl residue, natural substances and derivatives thereof such as lecithin, lanolin, or sarcosine, polar-group-containing linear organo(poly)siloxanes, in particular those having alkoxy groups with up to 10 carbon atoms and up to approximately 50 EO or PO groups.

Agents for adjusting pH are an important constituent of an adhesive that is suitable according to the present invention. The dispersions of the chlorinated polyolefins are usually stable in an alkaline medium, in which context the pH is intended to equal between 10 and 13. This can be ensured by way of the selection and quantity of the neutralizing agents. Bases such as alkali hydroxides or ammonium hydroxide, carbonates, or tertiary organic amines can be contained, for example $Na_2CO_3$, $K_2CO_3$, $NaHCO_3$, $KHCO_3$, $Na_3PO_4$, $Na_2HPO_4$, $CaCO_3$, $Ca(OH)_2$, NaOH or KOH, DBU, DBN, or borax. It is preferred to use mixtures that establish the pH indicated above. A buffer solution forms, which stabilizes the adhesive system.

Usual adjuvants and additives can furthermore be added to the adhesive. These can be stabilizers, pigments, or adhesion promoters. They are added usually in quantity of up to 5 wt %, by preference in quantities from approximately 0.1 to 3.0 wt % of the adhesive dispersion. The organic solvent content of the dispersion is intended to be low (less than 3 wt %). In particular, no solvents are added. The adhesive is solvent-free; only contaminants from the starting materials are present.

The adhesive is present in the form of a dispersion. The starting materials, for example the dispersion of the chlorinated polyolefins, in particular of chloroprene, and of the further binding agents, for example of the polyacrylates or styrene copolymers, can already exist in the form of an aqueous dispersion. These dispersions can be mixed; care must be taken in this context that the pH is adjusted so that a stable mixture is obtained, as is the case (as indicated above) in the alkaline pH range. The further additives can be mixed into this and dispersed.

The adhesive has a viscosity (measured at 25° C., per Brookfield, EN ISO 2555) of approx. 200 to 5000 mPas; the viscosity is intended in particular to be between 200 and 2000 mPas. The constituents of the dispersion are to be selected so that the total solids are equal to between 35 and 80 wt %, in particular between 45 and 65% (solids determined per DIN 53189, 105° C.).

The adhesive dispersion thus obtained is shelf-stable at a pH above 10. When the pH of the dispersion is lowered, the dispersion transitions into an unstable phase. Upon a further decrease in pH, the solids precipitate out. The adhesive coagulates and can no longer be applied. An adhesive according to the present invention is also to be understood, in particular, as an adhesive dispersion that, as an unstable form, has a low pH (adjusted with $CO_2$) of between 7.0 and 9.0.

A form according to the present invention of the aqueous adhesive is made up of 20 to 50 wt % (solids) chlorinated polyolefins, 5 to 35 wt % further polymers, 0 to 25 wt % plasticizers, and 0.01 to 5 wt % surfactants, as well as neutralizing agent and water; the total solids are to be equal to between 40 and 80%. A preferred embodiment additionally contains dissolved $CO_2$ in a quantity such that the pH is between 7.0 and 9.0. The adhesive is intended, in particular, to contain 25 to 40 wt % polychloroprene, 5 to 35 wt % poly(meth)acrylates and/or styrene copolymers, 0.1 to 15 wt % ester-based plasticizers, and 0.1 to 5 wt % anionic or nonionic surfactants, as well as neutralizing agent and water; the total solids are to be equal to between 45 and 65%. An adhesive according to the present invention can be used in particular in the method in accordance with the invention.

A further subject of the present invention is an apparatus for providing and carrying out a method according to the present invention. An essential constituent of the apparatus is an agitator vessel. This is selected so that it exhibits a smooth, easily cleaned inner surface. The shape is furthermore to be configured so that no dead volume exists during agitation. The reaction vessel is to comprise a corresponding agitator unit, for example a paddle agitator. The corresponding reaction vessel can be filled with the shelf-stable adhesive dispersion through an inflow and through an outflow.

This reaction vessel is further equipped with a pH measuring electrode and an introduction apparatus for gases. The electrode is arranged so that at the intended fill height for the aqueous adhesive dispersion, it is immersed thereinto and enables continuous measurement. The gas inlet is usually arranged so that it is located in the lower part of the agitator vessel. The inflowing gas (in this case the $CO_2$) is thereby introduced into the dispersion and, by agitation, homogenized with the dispersion.

An optionally present component of the apparatus is an overpressure valve. This is to be arranged so that it is located above the planned liquid level. It is intended to ensure that in the event too much $CO_2$ is introduced into the adhesive dispersion, overpressure cannot form in the vessel and excess $CO_2$ can escape.

The apparatus according to the present invention is furthermore intended to contain a control unit, which measures the pH of the solution in the reaction vessel. Said unit has a setting element at which a predefined pH value is to be set. The addition of $CO_2$ is regulated as long as the actual value differs from the target value. When the target value is reached, either $CO_2$ delivery is discontinued; or another embodiment of the invention contains a signal device. The latter responds when the target value is reached and generates a warning signal, for example a signal tone, for the user in clearly recognizable fashion.

In accordance with the procedure of the present invention, a defined quantity of a shelf-stable adhesive dispersion is placed into a mixing apparatus. The introduction of $CO_2$ is then started, the pH being continuously monitored. When the previously set target pH of the dispersion is reached, $CO_2$ delivery is reduced or discontinued. In addition, an alarm signal is generated, informing the user that the target value has been reached. According to one procedure, the adhesive can thereafter remain in the reaction vessel as a storage vessel. A portion of the adhesive that was introduced is removed from the outlet in accordance with the particular quantity to be applied. This removed quantity of adhesive can be applied onto a substrate, for example through a spray device. Another procedure empties the ready-to-process adhesive out of the reaction vessel.

The apparatus according to the present invention allows the method according to the present invention to be carried out in simple fashion.

The method according to the present invention can be utilized for various substrates. For example, it is possible to bond solid, rigid, or flexible substrates to one another. They can be manufactured from different materials; these materials can be natural ones such as wood, MDF, textiles made of natural fibers, glass, leather, etc. Substrates based on polymers or metal can, however, also be adhesively bonded. The substrates can be solid, but can also be flexible substrates such as, for example, films or foams. Identical substrates can be bonded to one another, and different substrates can also be bonded to one another. It is advantageous in the context of the procedure according to the present invention if at least one substrate is absorbent. The adhesive layer can be applied onto one substrate, but both surfaces to be adhesively bonded can also be coated with the adhesive. The quantity is to be selected by the skilled artisan in a manner adapted to the different substrates.

The adhesive usable according to the present invention has the advantage that it is substantially free of solvents. This prevents any contamination of the working environment with organic solvents. It has the further advantage that no additional chemical crosslinking needs to occur, thus ensuring a faster buildup of adhesion. The adhesive can moreover be stored for longer periods of time in its as-delivered form without losing its properties. Reproducible properties of the adhesive and of the adhesive layer are obtained by way of a quantity of $CO_2$ that is to be accurately measured, thereby enabling uniform processing.

The method according to the present invention has the advantage that before utilization, $CO_2$ is added to the adhesives in such a way that the pH is lowered to a predeterminable value. The method ensures that reproducible, uniformly rapid adhesive bonding is possible with the adhesive, even with a longer processing time. Homogenization of the gas in the quantity of dispersion made available ensures a uniform lowering of the pH. The result of controlling, by way of the pH of the solution, the quantity of $CO_2$ to be incorporated is that even with different adhesive batches and under different processing conditions (such as different mixing equipment, different mixing temperatures, or different aging), an adhesive dispersion that enables reproducible processing is produced in each case. Test bonds to check the adhesive that has been manufactured can thus be eliminated, and an automated procedure is possible.

A corresponding adhesive can be used as a wet-applied contact adhesive. In this context, bonding of an adhesive layer occurs as long as it still exhibits residual moisture.

EXAMPLE 1

A mixture is produced from

| | |
|---|---|
| Polychloroprene dispersion (Dispercoll C74 and C84, 1:6; approx. 55% solids) | 67% |
| Polyacrylate dispersion (Acronal S 400, approx. 56% solids) | 9% |
| Styrene/butadiene dispersion (Intex 131, approx. 65% solids) | 17.8% |
| Plasticizer (benzyl ester) | 1.8% |
| Sodium lauryl sulfate (10%) | 2.7% |

-continued

| | |
|---|---|
| Aging protection agent | 1.3% |
| Buffer solution (made up of glycine, borax, caustic soda, ammonium hydrogen carbonate) | approx. 0.5% |

The constituents are mixed in a high-speed agitation system. The result is a shelf-stable adhesive with a solids content of approx. 55 wt %. The pH is approx. 12. The viscosity of the adhesive is equal to approx. 300 mPas.

2500 g of the adhesive mixture is made ready in a vessel having a paddle agitator. $CO_2$ is introduced into the solution through a conduit below liquid level, the mixture being homogenized while agitating. The mixing vessel is equipped with a pH electrode that directly measures pH. The quantity of $CO_2$ is metered so that a pH of 7.6 is reached after 10 minutes.

The ready-to-process adhesive exhibits a shelf stability of more than 5 hours at room temperature.

The viscosity of the adhesive with the received $CO_2$ is equal to 300 mPas.

The adhesive can be applied by spray application onto substrates at a layer thickness of 200 g/m².

Test specimens (5×10 cm) of each of the following substrates are coated:
aluminum, MDF, soft foamed material, PVC, hard foam, solid wood.

After adhesive application, the test specimens are left to stand for 2 minutes, then bonded to an identical (uncoated) substrate with brief pressure.

An analogous bond is produced, a coated wood substrate being in each case bonded to the other substrates.

Initial and final adhesion is good.

Breakage of the adhesive bond results in material breakage within a substrate.

The quantity of $CO_2$ in the experiment according to the present invention is determined. This quantity is introduced into an identical quantity of dispersion.
Comparison 1: no agitator
Comparison 2: at 40° C., with agitator
Comparison 3: with a dispersion stored for 6 months.

The pH of the adhesive dispersion is measured. The measured values are between 7.2 and 8.0. Adhesive bonds exhibit different adhesive behavior.

The invention claimed is:

1. A method for producing a coagulated adhesive comprising the steps of:
    (a) providing an aqueous adhesive dispersion of a chlorinated polyolefin and an additive, which aqueous adhesive dispersion has a pH range from above 10 to 13;
    (b) introducing $CO_2$ gas to the aqueous adhesive dispersion and homogenizing the introduced $CO_2$ gas in the aqueous adhesive dispersion;
    (c) measuring the pH of the aqueous adhesive dispersion continuously during the $CO_2$ introduction;
    (d) stopping the introduction of $CO_2$ gas to the aqueous adhesive dispersion when the pH reaches 9.0 or below; whereby the aqueous adhesive dispersion coagulates; and
    wherein the steps (b) to (d) are conducted in a time period of from 0.5 to 20 minutes.

2. The method of claim 1, wherein in step (d), the pH ranges from 9.0 to 7.0.

3. The method of claim 1, wherein the aqueous adhesive dispersion has a viscosity of from 200 to 5000 mPas at 25° C., measured in accordance with EN ISO 2555.

4. The method of claim 1, wherein the aqueous adhesive dispersion has a solids content of from 40 to 80%.

5. A method of forming an article comprising the coagulated adhesive of claim 1 comprising the steps of:
   a. applying a layer of the coagulated adhesive onto a first substrate; and
   b. attaching a second substrate onto the coagulated adhesive;

whereby the two substrates become bonded.

6. The method of claim 5, wherein the coagulated adhesive is applied by spraying.

7. The method of claim 5, further comprising step (c) applying a pressure to the second substrate surface.

8. The method of claim 5, wherein at least one substrate is water absorbent.

9. The method of claim 5 wherein the coagulated adhesive has an open time of up to 15 minutes.

10. The method of claim 1, wherein in steps (b)-(d) are conducted in 2 to 15 minutes.

\* \* \* \* \*